United States Patent Office 3,364,749
Patented Jan. 23, 1968

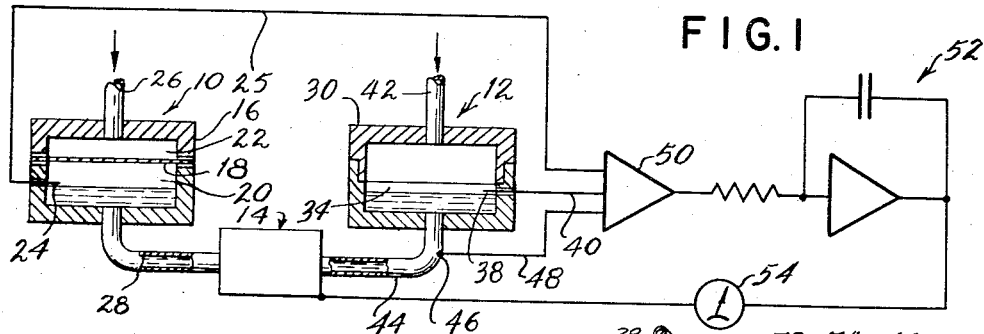
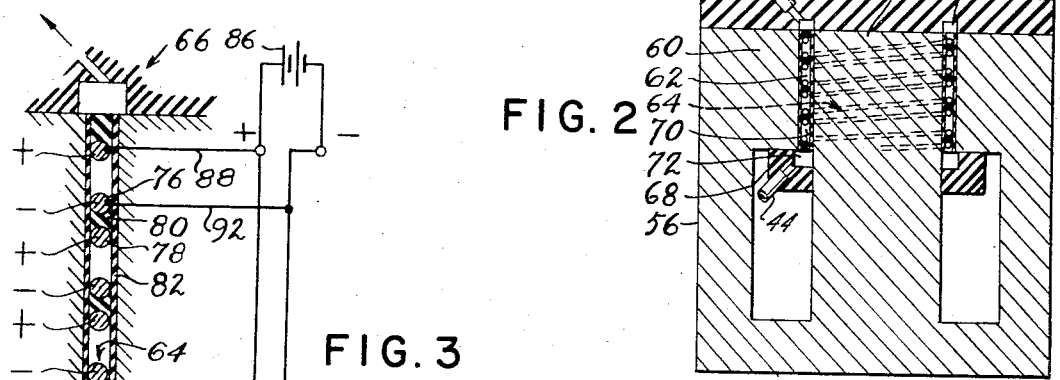
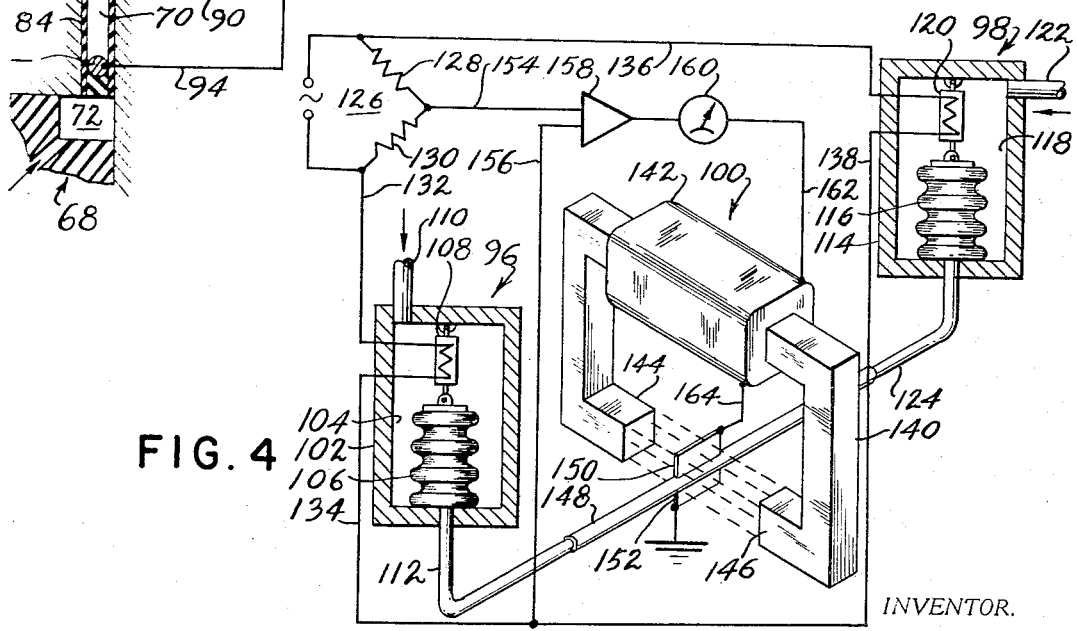

3,364,749
PRESSURE MEASURING SYSTEMS
Anatole J. Sipin, 117 E. 77th St., New York, N.Y. 10021
Filed Oct. 18, 1965, Ser. No. 497,000
11 Claims. (Cl. 73—398)

This invention relates to a system for measuring fluid pressure over a wide range with high accuracy.

Need exists in industrial processes and laboratory applications for an instrument that can measure absolute or differential pressure over a wide range with high sensitivity and high accuracy and that provides an electrical output for remote transmission that is not affected by transmission losses and interference.

Existing pressure transducers using the extension of an elastic member as a measure of applied pressure have a resolution which is a constant fraction of the full scale output, limiting the range of measurement. Also, such transducers often have delicate electrical elements with very small voltage outputs or high internal impedances, making it necessary to shield signal leads, use amplifiers with very high input impedances or take other measures to avoid spurious effects. Automatic manometers with follow-up systems have been constructed having high accuracy and satisfactory electrical outputs. These instruments, however, are complex and expensive; and their range is limited by a practical height for the manometer tubes. Force balance instruments are known in which the unknown pressure is applied as a force on a member and an electrically generated restoring force is applied to balance the member. The restoring force provides a measure of the unknown pressure. The pressure sensing member is typically an elastic member such as a bellows or diaphragm. It is difficult to provide high accuracy at high pressures with such devices. The restoring force is applied in relation to the deflection of the member. To withstand high pressure the elastic sensing member is stiff; and the spring force opposed to deflection introduces errors associated with other transducers using elastic elements.

It is an object of this invention to provide a system for measuring fluid pressure over a wide range with high accuracy.

It is another object of this invention to provide a system for measuring high pressures with high accuracy.

It is a third object of this invention to provide a system for measuring small differential pressures at high values of absolute pressure.

It is a fourth object of this invention to provide a system for measuring fluid pressure having an electrical output which is not affected by transmission losses.

It is a further object of this invention to provide a small and simply constructed device to meet the foregoing objectives.

The invention is a pressure measuring system of the force balance type in which the restoring force is applied electromagnetically to a conductive fluid. Unknown pressure is applied to a line containing electrically conductive fluid, moving the fluid. Motion of the conductive fluid is sensed by a pickup; and a pressure balancing device applies an electromagnetic force to the conductive fluid in accordance with the output of the pickup in a direction to null the fluid motion and restore a pressure balance. The force applied by the electro-magnetic device is measured to indicate the unknown pressure. The pressure balancing device can be an electromagnetic driver of known configuration in which magnetic flux and electric current are passed through the conductive fluid in orthogonal directions transverse to the line to apply a pressure force to the conductive fluid in the line by motor action. The principal advantage of this system over previous force balance devices is that the feedback is applied directly as a pressure and that an additional movable member is not essential to separate the unknown fluid from the environment. For example, the electromagnetic driver can be assembled between the branches of a U-tube mercury manometer; and level switches or other sensors used to detect motion of the mercury column from a reference position when pressure is applied. The manometer can be armored so that small values of differential pressure can be detected by the level sensor at high values of absolute pressure. If a permanent magnet or other constant field is applied, the current supplied to the electromagnetic driver is directly related to unknown pressure. This current can be measured by an ammeter at long distances from the sensor; and it is unaffected by transmission line resistance.

Different embodiments of the invention are described hereinafter in connection with the following drawings, disclosing various specific features and advantages.

In the drawings,

FIG. 1 is a schematic diagram of the pressure measuring system showing a preferred form of the invention.

FIG. 2 is a sectional elevation view of a preferred construction for the pressure balancing means shown in FIG. 1.

FIG. 3 is a fragmentary view showing a detail of the pressure balancing device shown in FIG. 2.

FIG. 4 is a schematic diagram of another embodiment of the pressure measuring system.

The pressure measuring system shown in FIG. 1 includes a first pressure sensing member 10, a second pressure sensing member 12, and an electromagnetic driver 14 connected to the pressure sensing members. Member 10 consists of a housing 16 with an internal cavity, a diaphragm 18, separating the cavity into two pressure chambers 20 and 22, an electrical contact 24 protruding into chamber 20, a lead 25 connecting contact 24 into an external circuit, a first tube 26, connecting chamber 22 to a source of unknown pressure, and a second tube 28 connecting chamber 20 to the electromagnetic driver. Member 12 includes housing 30, pressure chamber 34, contact 38 connected to lead 40 and fluid pressure tubes 42 and 44. The continuous channel formed by tubes 28 and 44 and electromagnetic driver 14 is filled with a conductive fluid, shown in FIG. 1 as a liquid, which also partially fills chambers 20 and 34. Electrode 46, insulated from tube 44, is immersed in the conductive liquid and connected into an external circuit through lead 48. Leads 25, 40 and 48 provide inputs to amplifier circuit 50, which supplies an imbalance signal to integrator 52, which in turn supplies driving current to the electromagnetic driver. The driving current is measured by indicator 54, which is calibrated in units of pressure.

Assuming that the pressure applied to chamber 22 through tube 26 is higher than that applied to chamber 34, the level of conductive liquid in chamber 20 will fall while that in chamber 34 will rise. When the level in chamber 34 has increased a small amount, the circuit between contact 38 and electrode 46 will be closed, causing a constant voltage of given polarity to be applied to integrator 52. The integrator delivers a continuously increasing value of electric current to the driver, which electromagnetically applies an increasing pressure to the conductive liquid in a direction opposite to its motion until the null levels in both chambers are restored, and the circuit between switch 38 and electrode 46 is again open. At this point the electromagnetic pressure exactly balances the unknown pressure differential applied to chambers 22 and 34. The electromagnetic pressure is also linearly related to the electrical current; and ammeter 54 is calibrated directly to indicate the unknown pressure.

If the pressure in chamber 34 exceeds that in chamber 22, the circuit between contact 24 and electrode 46 is closed, a current of opposite polarity is fed to the electromagnetic driver and meter 54 indicates the negative pressure differential.

If one of the chambers 22 and 34 is exposed to atmosphere, meter 54 will indicate gauge pressure or vacuum. The meter will indicate absolute pressure if one of the chambers is evacuated.

As shown in FIG. 1 the space between the liquid and diaphragm in chamber 20 is charged with gas. It is to be understood that the diaphragm is slack and that the gas volume varies so that its pressure is always that of the fluid in the chamber separated by the diaphragm. Alternatively, the space can be filled with a non-conductive liquid of lower specific gravity than the conductive liquid, in which event there will be insignificant volume change. Also the conductive liquid can be made to entirely fill chamber 20 and closure made between movable contacts on the slack diaphragm and fixed contact in chamber 22. It is to be understood that pressure sensing members 10 and 12 are only illustrative of means to contain the volume of conductive fluid within the system and to apply an unknown pressure to the line. Both pressure sensing members can include chambers sealed by flexible diaphragms, of which chamber 20 in sensing member 10 is an example. Or the chambers can be replaced by bellows. If the conductive fluid is a liquid, both pressure sensing members can be constructed as is member 12, with a single chamber 34 to act as a reservoir, containing the conductive fluid in the line. Here the unknown fluid pressure is applied directly to the conductive liquid in the chamber.

It is to be understood that all elements shown merely illustrate the function performed. Amplifier 50, for example, could be a relay; and integrator 52 could be a motor-driven potentiometer.

FIGS. 2 and 3 show details of construction of a preferred form of electromagnetic driver 14 in FIG. 1. The driver includes a magnet 56 having an axis with two coaxial poles, 58 with an external cylindrical face, and 60 with an internal cylindrical face, and an annular air gap 62 between the pole faces. A ribbon element 64 is spirally placed about the axis in the air gap, providing a continuous channel for conductive liquid in the air gap. Electrically insulating cover 66 seals one end of the air gap and insulating cover 68 seals the other end of the air gap. A continuous passage for conductive liquid between inlet tube 44 and outlet tube 28 is provided by spiral channel 70, formed between adjacent layers of element 64 and connecting with channel 72 in cover 68 and channel 74 in cover 66. The ribbon element is an assembly of a negative electrical conductor 76 and a positive electrical conductor 78 separated by an electrical insulator 80. Pole 58 is insulated by layer 82 and pole 60 is insulated by layer 84. Element 64 is bonded to both pole faces to seal the liquid channel between conductors of adjacent turns. The positive terminal of a source of electric current is connected to the positive conductor 78 of element 64 at one end by lead 88 and at the other end by lead 90. The negative terminal of the source is connected to the negative conductor 80 of element 64 at one end by lead 92 and at the other end by lead 94.

Assuming that the electrical polarities are as shown in FIG. 3, electrical current will flow from the positive conductor to the negative conductor in a direction parallel to the length of the air gap and perpendicular to the direction of flux. Force is thereby applied to move the conductive fluid in a spiral direction parallel to the conductors of element 64. The conductors are connected to the electrical source at both ends to obtain a uniform distribution of current denstiy. The applied force per unit length of the channel depends only on the flux density and the magnitude of electric current. By making the cross-sectional area of the flow channel small, the pressure achieved can be very high. This can be done by minimizing the width of the air gap, which has the beneficial effect of increasing flux density. Thus, high balancing pressures can be attained with a relatively small magnetic structure and relatively low values of current. The advantage of the invention can be appreciated by comparing the balancing means with those of conventional force feedback systems, where the balance pressure depends on the much larger cross-sectional area of an elastic member.

An AC source as well as a DC source can be utilized for the electrical current if the magnetic field is created by a coil energized by a constant voltage at the same frequency.

The structure for an electromagnetic driver shown in FIGS. 2 and 3 has advantages in other applications besides pressure measurement. It can be used as a calibrated pressure source for test purposes. It can also be used in a modified circuit of FIG. 1 as a pressure switch. The amplifier and integrator are removed, and the bias force for switching the contacts is adjusted by varying electrical current to driver 14. This device can be used as a high current relay.

The pressure measuring system shown schematically in FIG. 4 is advantageous for flow measurements as it indicates the square root of applied pressure. The system includes two pressure sensing members 96 and 98 and an electromagnetic driver 100. The first member 96 consists of a housing 102, with an internal cavity 104, a bellows 106, sealed from the internal cavity, with one end fixed to the housing, a strain gage 108 with one end fixed to the housing and the other end attached to the movable end of the bellows, a tube 110 leading unknown fluid pressure into cavity 104 and another tube 112 leading conductive fluid to the interior of the bellows from the electromagnetic driver. Pressure sensing member 98 similarly consists of housing 114 with cavity 118, bellows 116, straing gage 120 and tubes 122 and 124. Strain gages 108 and 120 are connected into a bridge circuit with resistors 128 and 130 through leads 132, 134, 136 and 138.

The electromagnetic driver consists of an electromagnet 140 with a field coil 142 and poles 144 and 146. A channel 148 leads conductive fluid past the poles with a flow path perpendicular to the direction of magnetic flux. Electrodes 150 and 152 apply electric current to the conductive fluid in a direction perpendicular to both the flow path and the direction of flux, thus applying pressure force to the conductive fluid along the flow path.

Leads 154 and 156 apply the bridge imbalance voltage to amplifier 158, which applies the same electric current to the field coil through lead 162 and thence to the electrode, which are series connected to the field coil through lead 164. Ammeter 160 measures the current and can be calibrated in units of flow or the square root of pressure. This is so because the balance pressure is proportional to the product of magnetic flux and current. Since the magnetic flux is here proportional to the current, the balance pressure is proportional to the square of the current; and since the unknown pressure equals the balance pressure, the current measurement indicates square root of pressure.

The system of FIG. 4 operates essentially the same as that of FIG. 1 except that the output of the strain gage bridge, sensing bellows displacement, is proportional to applied pressure. Other proportional displacement sensors can be used, such as variable capacitors, differential transformers and potentiometers. A carbon pile can also be used to sense unbalanced pressure force applied by the bellows. Here the carbon pile acts as a variable resistor directly in series with the leads of the electromagnetic driver and the amplifier can be eliminated.

One advantage of the invention is that the diaphragm and bellows sealing members can be very flexible as there is substantially no pressure across them in operation. This reduces pressure sensing error due to stiffness of the sealing member to a negligible level, whereas such an error is significant in devices where the member must seal the fluid from the atmosphere.

The system herein described can be utilized in many applications requiring detections of changes in fluid pressure. It can be used as a pressure control system, in which case a selected value of current is applied to the electromagnetic driver to establish a pressure reference, and the pressure imbalance signal is fed to a control device in a direction to restore pressure balance. The system can also be used to measure or control temperature, in which case the unknown pressure, proportional to temperature, is supplied from a temperature sensing element, such as a fluid-charged bulb. The system can also be used to measure or control liquid level, where the unknown pressure is directly related to the level of liquid being sensed.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A system for measuring fluid pressure including, a volume of electrically conductive fluid in a line having two ends, means at each end to contain the conductive fluid within the line, means for applying an unknown pressure to one end of the line to move the conductive fluid therein, means for sensing the motion of the conductive fluid having an output, electromagnetic means responsive to the output of the sensing means to apply a force to the conductive fluid balancing the unknown pressure force, and means for measuring the force applied by the electromagnetic means to provide an indication of the unknown pressure.

2. A system for measuring fluid presure of the character claimed in claim 1 in which the pressure balancing means is an electromagnetic driver with a magnet to apply magnetic flux in a direction transverse to the line and with electrodes in contact with the conductive fluid to apply an electric current through the fluid in a direction transverse to the line and perpendicular to the direction of flux, and the electric current is measured to provide an indication of the unknown pressure.

3. A system for measuring fluid pressure of the character claimed in claim 2 in which the magnet of the electromagnetic driver is an electromagnet with a coil, and the coil and electrodes are electrically connected so that the same current flows through each.

4. A system for measuring fluid pressure of the character claimed in claim 1 in which the motion sensing means includes an electrical switch and the pressure balancing means includes an integrator.

5. A system for measuring fluid pressure of the character claimed in claim 1 in which the conductive fluid containing means at one end of the line is a chamber sealed by a flexible diaphragm.

6. A system for measuring fluid pressure of the character claimed in claim 1 in which the conductive fluid containing means at one end of the line is a bellows.

7. A system for measuring fluid pressure of the character claimed in claim 1 in which the conductive fluid is a liquid and the containing means at one end of the line is a reservoir.

8. A system for measuring fluid pressure of the character claimed in claim 1 in which the motion sensing means provides an output which is proportional to the motion of the conductive fluid in the line from a reference.

9. A system for measuring fluid pressure of the character claimed in claim 8 in which the motion sensing means includes a strain gage bridge circuit and the bridge imbalance voltage controls the pressure balancing means.

10. A system for measuring fluid pressure including, a pair of pressure sensing elements, each element having an interior cavity divided by a flexible sealing member into two chambers, means to apply pressure to one chamber of each element, means to connect the other chambers to opposite ends of an electromagnetic driver, said chambers, driver and connecting means being filled with a conductive fluid, means to detect change in position of the conductive fluid when the applied pressure changes having an output, amplifying means responsive to the output of the detecting means to apply an electric current to the electromagnetic driver, and a meter to measure the current as an indication of the pressure.

11. A system for measuring fluid pressure of the character claimed in claim 10 in which the electromagnetic driver has a field coil connected in series to the fluid electrodes and the meter provides an indication of the square root of the pressure.

References Cited

UNITED STATES PATENTS 2,782,369   2/1957   Werner et al. _____ 73—194
3,034,002   5/1962   Carlson.

LOUIS R. PRINCE, Primary Examiner.

D. O. WOODIEL, Assistant Examiner.